US012559628B2

(12) United States Patent
Chon

(10) Patent No.: US 12,559,628 B2
(45) Date of Patent: Feb. 24, 2026

(54) CURABLE SILICONE COMPOSITION AND CURED PRODUCT THEREOF

(71) Applicant: DOW SILICONES CORPORATION, Midland, MI (US)

(72) Inventor: Jina Chon, Chungcheongbuk-do (KR)

(73) Assignee: DOW SILICONES CORPORATION, Midland, MI (US)

(*) Notice: Subject to any disclaimer, the term of this patent is extended or adjusted under 35 U.S.C. 154(b) by 451 days.

(21) Appl. No.: 18/027,951

(22) PCT Filed: Sep. 23, 2021

(86) PCT No.: PCT/US2021/051651
§ 371 (c)(1),
(2) Date: Mar. 23, 2023

(87) PCT Pub. No.: WO2022/066837
PCT Pub. Date: Mar. 31, 2022

(65) Prior Publication Data

US 2023/0365757 A1 Nov. 16, 2023

Related U.S. Application Data

(60) Provisional application No. 63/083,358, filed on Sep. 25, 2020.

(51) Int. Cl.

| | |
|---|---|
| ***C08L 83/06*** | (2006.01) |
| ***C08G 77/00*** | (2006.01) |
| ***C08G 77/14*** | (2006.01) |
| ***C08K 5/5415*** | (2006.01) |
| ***C08K 5/544*** | (2006.01) |
| ***C08K 5/549*** | (2006.01) |

(52) U.S. Cl.
CPC .............. *C08L 83/06* (2013.01); *C08G 77/14* (2013.01); *C08G 77/80* (2013.01); *C08K 5/5415* (2013.01); *C08K 5/5477* (2021.01); *C08K 5/549* (2013.01); *C08L 2205/025* (2013.01); *C08L 2312/06* (2013.01)

(58) Field of Classification Search
CPC ... C08L 2205/02; C08L 83/06; C09D 183/06; C09J 183/06
See application file for complete search history.

(56) References Cited

U.S. PATENT DOCUMENTS

| | | | | |
|---|---|---|---|---|
| 4,698,386 | A | 10/1987 | Fujimoto | |
| 4,788,240 | A | 11/1988 | Fujimoto | |
| 4,987,158 | A | 1/1991 | Eckberg | |
| 5,360,853 | A * | 11/1994 | Nagata | C08L 27/06 524/505 |
| 5,936,110 | A | 8/1999 | Yoshitake et al. | |
| 5,952,439 | A | 9/1999 | Morita et al. | |
| 5,959,038 | A | 9/1999 | Furukawa et al. | |
| 5,965,637 | A | 10/1999 | Pfander et al. | |
| 6,180,712 | B1 | 1/2001 | Ishikawa et al. | |
| 6,828,355 | B1 | 12/2004 | Chu | |
| 7,844,153 | B2 | 11/2010 | Watanabe et al. | |
| 7,964,248 | B2 | 6/2011 | Fong et al. | |
| 10,464,943 | B2 | 11/2019 | Takata et al. | |
| 2001/0034403 | A1 | 10/2001 | Takuman et al. | |
| 2002/0156187 | A1 | 10/2002 | Greene | |
| 2004/0102563 | A1 | 5/2004 | Schottland et al. | |
| 2004/0265599 | A1 | 12/2004 | Ushio et al. | |
| 2005/0170187 | A1 | 8/2005 | Ghoshal | |
| 2005/0282959 | A1 | 12/2005 | Ahn et al. | |
| 2006/0205861 | A1 | 9/2006 | Gordon et al. | |
| 2007/0275255 | A1 | 11/2007 | Ooms et al. | |
| 2007/0287765 | A1 | 12/2007 | Busch et al. | |
| 2007/0287771 | A1 | 12/2007 | Yamazaki et al. | |
| 2008/0176086 | A1 | 7/2008 | Irifune | |
| 2008/0260337 | A1 | 10/2008 | Bahadur et al. | |
| 2009/0105441 | A1 | 4/2009 | Ushio et al. | |
| 2009/0294023 | A1 | 12/2009 | Berger et al. | |
| 2010/0069523 | A1 | 3/2010 | Alvarez et al. | |
| 2010/0103507 | A1 | 4/2010 | Imazawa et al. | |
| 2010/0120975 | A1 | 5/2010 | Kuroda et al. | |
| 2012/0220681 | A1 | 8/2012 | Bae et al. | |
| 2013/0203882 | A1 | 8/2013 | Cherkaoui et al. | |
| 2013/0235515 | A1 | 9/2013 | Ouderkirk et al. | |

(Continued)

FOREIGN PATENT DOCUMENTS

| | | | |
|---|---|---|---|
| CN | 1719338 | A | 1/2006 |
| CN | 106800655 | A | 11/2015 |

(Continued)

OTHER PUBLICATIONS

International Search Report for PCT/US2021/051651 dated Jan. 13, 2022, 5 pages.
Machine assisted English translation of JP2004176011A obtained from https://worldwide.espacenet.com/patent on Jun. 26, 2023, 9 pages.
Machine assisted English translation of JPH11279182A obtained from https://worldwide.espacenet.com/patent on Jun. 26, 2023, 11 pages.

(Continued)

*Primary Examiner* — Marc S Zimmer

(74) *Attorney, Agent, or Firm* — Warner Norcross + Judd LLP

(57) ABSTRACT

A curable silicone composition is provided. The composition comprises: (A) an epoxy-functional silicone resin having monovalent aromatic hydrocarbon groups; (B) an epoxy-functional silicone; (C) a cationic photoinitiator; and (D) a silatrane derivative or a carbasilatrane derivative, wherein each derivative has at least one silicon atom-bonded alkoxy group per molecule. The composition has excellent curability with UV radiation, and further with heating, generally forms a cured product with excellent thermal and light resistance, and adhesion properties.

7 Claims, No Drawings

(56) References Cited

U.S. PATENT DOCUMENTS

| | | | |
|---|---|---|---|
| 2013/0331476 | A1 | 12/2013 | Bae et al. |
| 2014/0154626 | A1 | 6/2014 | Bujalski et al. |
| 2014/0205949 | A1 | 7/2014 | Hara et al. |
| 2014/0238580 | A1 | 8/2014 | Zhang et al. |
| 2014/0342100 | A1 | 11/2014 | Valeri |
| 2015/0064432 | A1 | 3/2015 | Matsuyuki et al. |
| 2015/0334587 | A1 | 11/2015 | Kim et al. |
| 2017/0010529 | A1 | 1/2017 | Aoyagi |
| 2017/0204231 | A1 | 7/2017 | Tsukao et al. |
| 2017/0267703 | A1 | 9/2017 | Kusunoki et al. |
| 2018/0334587 | A1 | 11/2018 | Betzig et al. |
| 2019/0136041 | A1 | 5/2019 | Matsuoka |
| 2019/0144704 | A1 | 5/2019 | Kawamura et al. |
| 2019/0185710 | A1 | 6/2019 | Mulzer et al. |
| 2020/0048462 | A1 | 2/2020 | Ahn et al. |
| 2020/0056056 | A1 | 2/2020 | Ahn et al. |
| 2020/0199403 | A1 | 6/2020 | Liu et al. |
| 2020/0325337 | A1 | 10/2020 | Prasse et al. |
| 2023/0046737 | A1 | 2/2023 | Chon |
| 2024/0018308 | A1 | 1/2024 | Chon |
| 2024/0158580 | A1 | 5/2024 | Lee |
| 2024/0279400 | A1 | 8/2024 | Chon |

FOREIGN PATENT DOCUMENTS

| | | | |
|---|---|---|---|
| CN | 108102277 | A | 6/2018 |
| CN | 108192283 | A | 6/2018 |
| CN | 111393586 | A | 7/2020 |
| CN | 112795347 | A | 5/2021 |
| EP | 908462 | A2 * | 4/1999 |
| EP | 1099737 | A1 | 5/2001 |
| EP | 1134256 | A1 | 9/2001 |
| EP | 1136533 | A1 | 9/2001 |
| EP | 2363430 | A1 | 9/2011 |
| EP | 2772505 | A1 | 9/2014 |
| JP | H09124976 | A | 5/1997 |
| JP | H10195085 | A | 7/1998 |
| JP | H11279182 | A | 10/1999 |
| JP | 2004176011 | A | 6/2004 |
| JP | 2004196977 | A | 7/2004 |
| JP | 2009298887 | A | 12/2009 |
| JP | 2012171983 | A | 9/2012 |
| JP | 2013095874 | A | 5/2013 |
| JP | 2015199815 | A | 11/2015 |
| JP | 2016210879 | A | 12/2016 |
| JP | 2018111792 | A | 7/2018 |
| KR | 101244204 | B1 | 3/2013 |
| KR | 20170113220 | A | 10/2017 |
| WO | 2003062208 | A1 | 7/2003 |
| WO | 2008078663 | A1 | 7/2008 |
| WO | 2019003991 | A1 | 1/2019 |
| WO | 2021127246 | A1 | 6/2021 |

OTHER PUBLICATIONS

Machine assisted English translation of JPH10195085A obtained from https://worldwide.espacenet.com/patent on Jun. 26, 2023, 13 pages.

Machine assisted English translation of JP2016210879A obtained from https://worldwide.espacenet.com/patent on Jun. 26, 2023, 40 pages.

Machine assisted English translation of CN106800655A obtained from https://worldwide.espacenet.com/patent on Jun. 29, 2023, 16 pages.

J. K. Puri et al.: “Silatranes: a review on their synthesis, structure, reactivity and applications”, Chem. Soc. Rev., vol. 40, No. 3, Jan. 1, 2011 (Jan. 1, 2011), pp. 1791-1840.

* cited by examiner

CURABLE SILICONE COMPOSITION AND CURED PRODUCT THEREOF

CROSS-REFERENCE TO RELATED APPLICATIONS

The application is the U.S. National Stage of PCT/US2021/051651 filed on 23 Sep. 2021, which claims priority to and all advantages of U.S. Provisional Patent Application No. 63/083,358 filed on 25 Sep. 2020, the content of which is incorporated herein by reference.

TECHNICAL FIELD

The present invention relates to a curable silicone composition and a cured product thereof.

BACKGROUND ART

Epoxy-functional silicones are used for curable silicone compositions which can be cured by irradiation with ultraviolet ("UV") ray. For example, Patent Document 1 discloses a curable silicone composition comprising: an epoxy-functional silicone resin represented by the average unit formula: $(R_3SiO_{1/2})_i(R_2SiO_{2/2})_{ii}(RSiO_{3/2})_{iii}(SiO_{4/2})_{iv}$, wherein each R is an organic group is independently selected from $C_{1-6}$ monovalent aliphatic hydrocarbon group, $C_{6-10}$ monovalent aromatic hydrocarbon group, and a monovalent epoxy-substituted organic group; 0i<0.4, 0<ii<0.5, 0<iii<1, i+ii+iii+iv=1, the resin has a number-average molecular weight of at least about 2,000, at least about 15 mol % of the organic groups are $C_{6-10}$ monovalent aromatic hydrocarbon groups, and about 2 to about 50 mol % of siloxane units have epoxy-substituted organic groups; an epoxy-functional silicone oligomer represented by the general formula: $R''R'_2SiO(R'_2SiO)_vSiR'_2R''$, wherein each R' is $C_{1-8}$ alkyl group, each R" is an epoxy-substituted organic group, "v" is 0 or a positive integer; and a cationic photoinitiator, wherein the composition can be cured by irradiation with UV ray.

However, such a curable silicone composition has a problem that the composition is not sufficiently cured, or a cured product has poor adhesion properties, and, when the cured product is subjected to heat or light for a long duration, it easily exhibits yellowing.

Therefore, it is desired to develop a curable silicone composition with excellent curability with UV radiation, and further with heating, to form a cured product with good thermal and light resistance, and adhesion properties.

CITATION LIST

Patent Literature

Patent Document 1: United States Patent Application Publication No. 2014/154626 A1

SUMMARY OF INVENTION

Technical Problem

An objective of the present invention is to provide a curable silicone composition with excellent curability with UV radiation, and further with heating, to form a cured product with good thermal and light resistance, and adhesion properties. Another objective of the present invention is to provide a cured product with excellent thermal and light resistance, and adhesion properties.

Solution to Problem

The curable silicone composition of the present invention comprises:

(A) an epoxy-functional silicone resin represented by the following average unit formula:

$$(R^1_3SiO_{1/2})_a(R^1_2SiO_{2/2})_b(R^1SiO_{3/2})_c(SiO_{4/2})_d$$

wherein each $R^1$ is the same or different organic group selected from a $C_{1-6}$ monovalent aliphatic hydrocarbon group, $C_{6-10}$ monovalent aromatic hydrocarbon group, and a monovalent epoxy-substituted organic group, provided that at least about 15 mol % of the total $R_1$ are the $C_{6-10}$ monovalent aromatic hydrocarbon groups; and "a", "b", "c" and "d" are numbers that satisfy the following conditions: 0a≤0.4, 0<b<0.5, 0≤c<1, 0c≤0.4, 0.1≤b/c0.6, and a+b+c+d=1; and about 2 to about 30 mol % of the total siloxane units have the monovalent epoxy-substituted organic groups;

(B) an epoxy-functional silicone represented by the following general formula:

$$X^1—R^2_2SiO(SiR^2_2O)_mSiR^2_2—X^1$$

wherein each $R^2$ is the same or different organic group selected from a $C_{1-6}$ monovalent aliphatic hydrocarbon group and a $C_{6-10}$ monovalent aromatic hydrocarbon group; each $X_1$ is the same or different group selected from a monovalent epoxy-substituted organic group and an epoxy-functional siloxy group represented by the following general formula:

$$X^2—R^3_2SiO(SiR^3_2O)_xSiR^3_2—R^4—$$

wherein each $R^3$ is the same or different $C_{1-6}$ monovalent aliphatic hydrocarbon group; $R^4$ is a $C_{2-6}$ alkylene group; $X^2$ is a monovalent epoxy-substituted organic group; and "x" is a number of from about 0 to about 5, and "m" is a number of from about 0 to about 100, in an amount of from about 5 mass % to about 40 mass % of the total mass of components (A), (B), (C) and (D);

(C) a cationic photoinitiator, in an amount of from about 0.2 mass % to about 2 mass % of the total mass of components (A), (B), (C) and (D); and (D) a silatrane derivative or a carbasilatrane derivative, wherein each derivative has at least one silicon atom-bonded alkoxy group per molecule, in an amount of from about 0.01 mass % to about 5.0 mass % of the total mass of components (A), (B), (C) and (D).

In various embodiments, the monovalent epoxy-substituted organic groups in component (A) are groups selected from glycidoxyalkyl groups, 3,4-epoxycyclohexylalkyl groups, and epoxyalkyl groups.

In various embodiments, the monovalent epoxy-substituted organic groups in component (B) are groups selected from glycidoxyalkyl groups, 3,4-epoxycyclohexylalkyl groups, and epoxyalkyl groups.

In various embodiment, component (D) is a silatrane derivative or a carbasilatrane derivative represented by the following general formula:

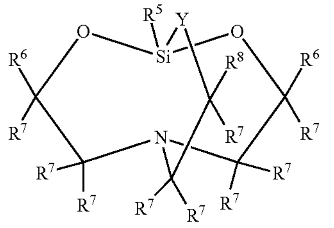

wherein $R^5$ is a group selected from a $C_{1-6}$ alkyl group, a $C_{2-6}$ alkenyl group, and a $C_{1-6}$ alkoxy group; each $R^6$ is the same or different alkoxysilyl alkyloxyalkyl group; each $R^7$ is the same or different hydrogen atom or a $C_{1-6}$ alkyl group; $R^8$ is a hydrogen atom or an alkoxysilyl alkyloxyalkyl group; and Y is an oxygen atom or a methylene group.

In various embodiments, component (D) is a carbasilatrane derivative represented by the following formula:

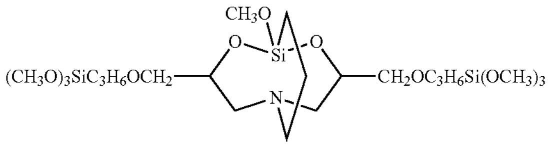

or a silatrane derivative represented by the following formula:

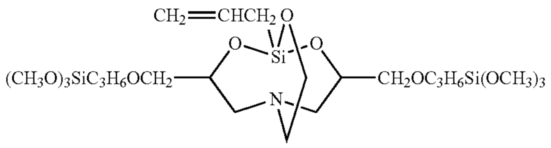

The cured product of the present invention is obtained by curing the curable silicone composition described above.

Effects of Invention

The curable silicone composition of the present invention has excellent curability with UV radiation, and further with heating to form a cured product with excellent thermal and light resistance, and adhesion properties. While, the cured product of the present invention has excellent thermal and light resistance, and adhesion properties.

DETAILED DESCRIPTION OF THE INVENTION

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated. Generally, as used herein a ">" is "above" or "greater-than"; a "≥" is "at least" or "greater-than or equal to"; a "<" is "below" or "less-than"; and a "≤" is "at most" or "less-than or equal to."

The terms "epoxy-functional" or "epoxy-substituted" as used herein refers to a functional group in which an oxygen atom, the epoxy substituent, is directly attached to two adjacent carbon atoms of a carbon chain or ring system. Examples of epoxy-substituted functional groups include, but are not limited to, glycidoxyalkyl groups such as 2-glycidoxyethyl groups, 3-glycidoxypropyl groups, 4-glycidoxybutyl groups or the like; (3,4-epoxycycloalkyl)alkyl groups such as 2-(3,4-epoxycylohexyl)ethyl groups, 3-(3,4-epoxycylohexyl)propyl groups, 2-(3,4-epoxy-3-methylcylohexyl)-2-methylethyl groups, 2-(2,3-epoxycylopentyl)ethyl groups, 3-(2,3-epoxycylopentyl)propyl groups, and the like; and epoxyalkyl groups such as 2,3-epoxypropyl groups, 3,4-epoxybutyl groups, 4,5-epoxypentyl groups, and the like.

<Curable Silicone Composition>

Component (A) is an epoxy-functional silicone resin represented by the following average siloxane unit formula:

$$(R^1_3SiO_{1/2})_a(R^1_2SiO_{2/2})_b(R^1SiO_{3/2})_c(SiO_{4/2})_d.$$

In the formula, each $R^1$ is the same or different organic group selected from a $C_{1-6}$ monovalent aliphatic hydrocarbon group, $C_{6-10}$ monovalent aromatic hydrocarbon group, and a monovalent epoxy-substituted organic group.

Examples of the $C_{1-6}$ monovalent aliphatic hydrocarbon groups in component (A) include $C_{1-6}$ alkyl groups such as methyl groups, ethyl groups, propyl groups, butyl group, and hexyl groups; $C_{2-6}$ alkenyl groups such as vinyl groups, allyl groups, and hexenyl groups; and $C_{1-6}$ halogenated alkyl groups such as 3-chloropropyl groups and 3,3,3-trifluoropropyl groups. Among these, methyl groups are generally preferred.

Examples of the $C_{6-10}$ monovalent aromatic hydrocarbon groups in component (A) include phenyl groups, tolyl groups, xylyl groups, and naphthyl groups. Among these, phenyl groups are generally preferred.

Examples of the monovalent epoxy-substituted organic groups in component (A) include glycidoxyalkyl groups such as 3-glycidoxypropyl groups, 4-glycidoxybutyl groups and 5-glycidoxypentyl groups; 3,4-epoxycycloalkyl alkyl groups such as 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3-epoxycylopentyl)propyl; and epoxyalkyl groups such as 2,3-epoxypropyl groups, 3,4-epoxybutyl groups, and 4,5-epoxypentyl groups. Among these, 3,4-epoxycycloalkyl alkyl groups are generally preferred.

In component (A), at least about 15 mol %, optionally at least about 20 mol %, or optionally at least about 25 mol %, of the total $R^1$ are the $C_{6-10}$ monovalent aromatic hydrocarbon groups. If the content of the monovalent aromatic hydrocarbon groups is greater than or equal to the lower limit described above, the optical transmittance of the cured product can increase as well as mechanical properties thereof increase.

In the formula, "a", "b", "c", and "d" are mole fractions and numbers that satisfy the following conditions: $0a\leq 0.4$, $0<b<0.5$, $0<c<1$, $0\leq d<0.4$, $0.1\leq b/c\leq 0.6$, and $a+b+c+d=1$, optionally $a=0$, $0<b<0.5$, $0<c<1$, $0\leq d<0.2$, $0.1<b/c\leq 0.6$, and $b+c+d=1$, or optionally $a=0$, $0<b<0.5$, $0<c<1$, $d=0$, 0.1<b/ c≤0.6, and b+c=1. "a" is 0≤a<0.4, optionally 0≤a<0.2, or optionally a=0, because the molecular weight of the epoxy-containing organopolysiloxane resin (A) drops when there are too many ($R^1{}_3SiO_{1/2}$) siloxane units, and, when ($SiO_{4/2}$) siloxane units are introduced, the hardness of the cured product of the epoxy-functional silicone resin (A) is markedly increased and the product can be easily rendered brittle. For this reason, "d" is 0≤d<0.4, optionally 0≤d<0.2, or optionally d=0. In addition, the molar ratio "b/c" of the ($R^1{}_2SiO_{2/2}$) units and ($R^1SiO_{3/2}$) units can be not less than about 0.1 and not more than about 0.6. In some examples, deviation from this range in the manufacture of the epoxy-functional silicone resin (A) can result in generation of insoluble side products, in making the product more prone to cracking due to decreased toughness, or in a decrease in the strength and elasticity of the product and making it more prone to scratching. In some examples, the range molar ratio "b/c" is more than about 0.1 and not more than about 0.6. The epoxy-functional silicone resin (A) contains the ($R^1{}_2SiO_{2/2}$) siloxane units and the ($R^1SiO_{3/2}$) siloxane units, and its molecular structure is in most cases a network structure or a three-dimensional structure because the molar ratio of "b/c" is more than about 0.1 and not more than about 0.6. Thus, in the epoxy-functional silicone resin (A), the ($R^1{}_2SiO_{2/2}$) siloxane units and the ($R^1SiO_{3/2}$) siloxane units are present, whereas the ($R^1{}_3SiO_{1/2}$) siloxane units and the ($SiO_{4/2}$) siloxane units are optional constituent units. That is, there can be epoxy-functional silicone resins including the following average unit formulas:

$$(R^1{}_2SiO_{2/2})_b(R^1SiO_{3/2})_c$$

$$(R^1{}_3SiO_{1/2})_a(R^1{}_2SiO_{2/2})_b(R^1SiO_{3/2})_c$$

$$(R^1{}_2SiO_{2/2})_b(R^1SiO_{3/2})_c(SiO_{4/2})_d$$

$$(R^1{}_3SiO_{1/2})_a(R^1{}_2SiO_{2/2})_b(R^1SiO_{3/2})_c(SiO_{4/2})_d$$

In component (A), about 2 to about 30 mol % of siloxane units, optionally about 10 mol % to about 30 mol %, or optionally about 15 mol % to about 30 mol %, of all the siloxane units in a molecule have epoxy-substituted organic groups. If there is greater than or equal to the lower limit of the range mentioned above of such siloxane units, the density of cross-linking during curing can increase. On the other hand, the amount is less than or equal to the upper limit of the range mentioned above can be suitable because it can bring about an increase in the optical transmittance and heat resistance of the cured product. In the epoxy-functional monovalent hydrocarbon groups, the epoxy groups can be bonded to silicon atoms through alkylene groups, such that these epoxy groups are not directly bonded to the silicon atoms. The epoxy-functional silicone resin (A) can be produced by well-known conventional manufacturing methods.

While there are no particular limitations concerning the weight-average molecular weight of the epoxy-functional silicone resin (A), if the toughness of the cured product and its solubility in organic solvents are taken into consideration, in some embodiments the molecular weight is not less than about $10^3$ and not more than about $10^6$. In one embodiment, the epoxy-functional silicone resin (A) includes a combination of two or more kinds of such epoxy-functional silicone resins with different content and type of the epoxy-containing organic groups and monovalent hydrocarbon groups or with different molecular weights.

Component (B) is an epoxy-functional silicone represented by the following general formula:

$$X^1—R^{22}SiO(SiR^2{}_2O)_mSiR^2{}_2—X^1.$$

In the formula, each $R^2$ is the same or different organic group selected from a $C_{1-6}$ monovalent aliphatic hydrocarbon group and a $C_{6-10}$ monovalent aromatic hydrocarbon group.

Examples of the $C_{1-6}$ monovalent aliphatic hydrocarbon groups in component (B) include $C_{1-6}$ alkyl groups such as methyl groups, ethyl groups, propyl groups, butyl group, and hexyl groups; $C_{2-6}$ alkenyl groups such as vinyl groups, allyl groups, and hexenyl groups; and $C_{1-6}$ halogenated alkyl groups such as 3-chloropropyl groups and 3,3,3-trifluoropropyl groups. Among these, methyl groups are generally preferred.

Examples of the $C_{6-10}$ monovalent aromatic hydrocarbon groups in component (B) include phenyl groups, tolyl groups, xylyl groups, and naphthyl groups. Among these, phenyl groups are generally preferred.

In the formula, each $X^1$ is the same or different group selected from a monovalent epoxy-substituted organic group and an epoxy-functional siloxy group represented by the following general formula:

$$X^2—R^3{}_2SiO(SiR^3{}_2O)_xSiR^3{}_2—R^4—.$$

Examples of the monovalent epoxy-substituted organic groups for $X^1$ include glycidoxyalkyl groups such as 3-glycidoxypropyl groups, 4-glycidoxybutyl groups and 5-glycidoxypentyl groups; 3,4-epoxycycloalkyl alkyl groups such as 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3-epoxycylopentyl)propyl; and epoxyalkyl groups such as 2,3-epoxypropyl groups, 3,4-epoxybutyl groups, and 4,5-epoxypentyl groups. Among these, 3,4-epoxycycloalkyl alkyl groups are generally preferred.

In the general formula above, each $R^3$ is the same or different $C_{1-6}$ monovalent aliphatic hydrocarbon group. Examples of the $C_{1-6}$ monovalent aliphatic hydrocarbon groups for $R^3$ include $C_{1-6}$ alkyl groups such as methyl groups, ethyl groups, propyl groups, butyl group, and hexyl groups; $C_{2-6}$ alkenyl groups such as vinyl groups, allyl groups, and hexenyl groups; and $C_{1-6}$ halogenated alkyl groups such as 3-chloropropyl groups and 3,3,3-trifluoropropyl groups. Among these, methyl groups are generally preferred.

In the general formula above, $R^4$ is a $C_{2-6}$ alkylene group. Examples of the $C_{2-6}$ alkylene groups for $R^4$ include ethylene groups, methylethylene groups, propylene groups, butylene group, and hexylene groups. Among these, ethylene groups are generally preferred.

In the general formula above, $X^2$ is a monovalent epoxy-substituted organic group. Examples of the monovalent epoxy-substituted organic groups for $X^2$ include glycidoxyalkyl groups such as 3-glycidoxypropyl groups, 4-glycidoxybutyl groups and 5-glycidoxypentyl groups; 3,4-epoxycycloalkyl alkyl groups such as 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3-epoxycylopentyl)propyl; and epoxyalkyl groups such as 2,3-epoxypropyl groups, 3,4-epoxybutyl groups, and 4,5-epoxypentyl groups. Among these, 3,4-epoxycycloalkyl alkyl groups are generally preferred.

In the general formula above, "x" is a number of from about 0 to about 5, optionally from about 0 to about 2, or optionally about 0.

In the general formula above, "m" is a number of from about 0 to about 100, optionally from about 0 to about 20, or optionally from about 0 to about 10. If "m" is less than or equal to the upper limit of the range described above, optical performance of the cured product can increase.

The state of component (B) at 25° C. is not limited, but it is generally a liquid. The viscosity at 25° C. of component (B) is not limited; however, the viscosity is generally in a range of from about 5 to about 100 mPa·s. Note that in the present specification, viscosity is the value measured using a type B viscometer according to ASTM D 1084 at 23±2° C.

The content of component (B) is in an amount of from about 5 mass % to about 40 mass %, optionally in an amount of from about 10 mass % to about 40 mass %, optionally in an amount of from about 10 mass % to about 35 mass %, or optionally in an amount of from 10 mass % to about 30 mass %, of the total mass of components (A), (B) (C) and (D). If the content of component (B) is greater than or equal to the lower limit of the range described above, flexibility and impact strength of the cured product can increase. On the other hand, the content is less than or equal to the upper limit of the range described above, toughness and tensile strength of the cured product can increase.

Component (C) is a cationic photoinitiator used as a photoinitiator for epoxy-functional silicone. Any cationic photoinitiator that is known by one of skill in the art can be used, such as sulfonium salts, iodonium salts, selenonium salts, phosphonium salts, diazonium salts, para-toluene sulfonates, trichloromethyl-substituted triazines, and trichloromethyl-substituted benzenes. Examples of sulfonium salts can include salts represented by the formula: $R^c_3S^+X^-$. In the formula, $R^c$ can stand for methyl, ethyl, propyl, butyl, and other $C_{1-6}$ alkyl groups; phenyl, naphthyl, biphenyl, tolyl, propylphenyl, decylphenyl, dodecylphenyl, and other $C_{1-24}$ aryl group or substituted aryl groups, and $X^-$ in the formula can represent $SbF_6^-$, $AsF_6^-$, $PF_6^-$, $BF_4^-$, $B(C_6F_5)_4^-$, $HSO_4^-$, $ClO_4^-$, $CF_3SO_3^-$ and other non-nucleophilic non-basic anions. Examples of iodonium salts can include salts represented by the formula: $R^c_2I^+X^-$; examples of selenonium salts can include salts represented by the formula: $R^c_3Se^+X^-$; examples of phosphonium salts can include salts represented by the formula: $R^c_4P^+X^-$; examples of diazonium salts can include salts represented by the formula: $R^cN_2^+X^-$; with the $R^C$ and $X^-$ in the formulas being the same as described herein for $R^c_3S^+X^-$. Examples of para-toluene sulfonates can include compounds represented by the formula: $CH_3C_6H_4SO_3R^{c^1}$ with the $R^{c^1}$ in the formula standing for organic groups including electron-attracting groups, such as benzoylphenylmethyl groups, phthalimide groups, and the like. Examples of trichloromethyl-substituted triazines can include compounds represented by $[CCl_3]_2C_3N_3R^{c^2}$, with the $R^{c^2}$ in the formula standing for phenyl, substituted or unsubstituted phenylethyl, substituted or unsubstituted furanylethynyl, and other electron-attracting groups. Examples of trichloromethyl-substituted benzenes can include compounds represented by $CCl_3C_6H_3R^cRR^{c^3}$, with the $R^c$ in the formula being the same as described herein for $R^c_3S^+X^-$ and the FP standing for halogen groups, halogen-substituted alkyl groups, and other halogen-containing groups.

Examples of the photoinitiator can include, for example, triphenylsulfonium tetrafluoroborate, di(p-tertiary butylphenyl)iodonium hexafluoroantimonate, bis(dodecylphenyl)iodonium hexafluoroantimonate, 4-isopropyl-4'-methyldiphenyliodonium tetrakis(pentafluorophenyl)borate salt, and p-chlorophenyldiazonium tetrafluoroborate.

The content of component (C) is in an amount of from about 0.2 mass % to about 2 mass %, optionally in an amount of from about 0.2 mass % to about 1 mass %, or optionally in an amount of from about 0.2 mass % to about 0.8 mass %, of the total mass of components (A), (B), (C) and (D). If the content of component (C) is greater than or equal to the lower limit of the range described above, the curable silicone composition is cured fully. On the other hand, the content is less than or equal to the upper limit of the range described above, optical performance of the cured product can increase.

Component (D) is a silatrane derivative or a carbasilatrane derivative, wherein the derivative has at least one silicon atom-bonded alkoxy group per molecule. Since the present composition comprises component (D), when a cured product thereof is subjected to heat or light for a long duration, it exhibits excellent thermal and light resistance. Such a silatrane derivative or a carbasilatrane derivative for component (D) is typically represented by the following general formula:

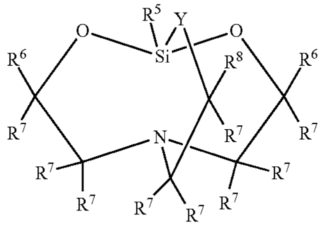

In the formula, $R^5$ is a group selected from a $C_{1-6}$ alkyl group such as methyl groups, ethyl group and butyl groups; a $C_{2-6}$ alkenyl group such as vinyl groups, allyl groups and hexenyl groups; and a $C_{1-6}$ alkoxy group such as methoxy group, ethoxy groups and propoxy groups. Among these, methyl groups, vinyl groups and methoxy groups are generally preferred.

In the formula, each $R^6$ is the same or different alkoxysilyl alkyloxyalkyl groups such as trimethoxysilyl propyloxymethyl groups, dimethoxymethylsilyl propyloxymethyl groups, triethoxysilyl propyloxymethyl groups, diethoxymethylsilyl propyloxymethyl groups, trimethoxysilyl methyloxymethyl groups, and dimethoxymethylsilyl propyloxymethyl groups.

In the formula, each $R^7$ is the same or different hydrogen atoms or a $C_{1-6}$ alkyl group such as methyl groups, ethyl group and butyl groups. Among these, hydrogen atoms are generally preferred.

In the formula, $R^8$ is a hydrogen atom or an alkoxysilyl alkyloxyalkyl groups such as mentioned above. Among these, hydrogen atoms are generally preferred.

In the formula, Y is an oxygen atom or a methylene group.

Exemplary silatrane and carbasilatrane derivatives may include compounds represented by the following formulas:

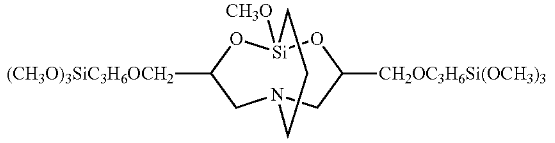

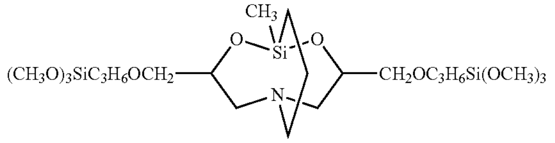

-continued

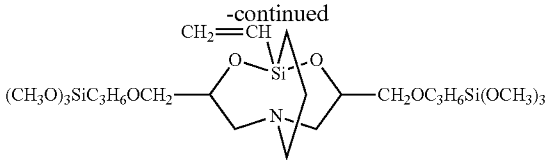

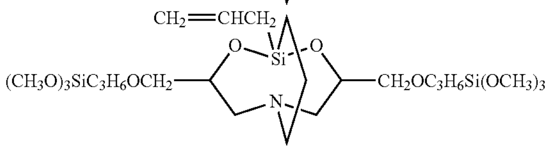

A method for producing silatrane and carbasilatrane derivative is well-known. For example, silatrane derivatives can be produced as reaction products of an alkoxysilane with an epoxy-functional compound and amino-functional compound by a method described in JP H11-279182 A. While, carbasilatrane derivatives can be produced as reaction products of an epoxy-functional alkoxysilane with an amino-functional alkoxysilane by a method described in JP H10-195085 A.

The content of component (D) is not limited, but it is generally in an amount of from about 0.01 to about 5 mass %, or optionally in an amount of from about 0.1 to about 2 mass %, of the total mass of components (A), (B), (C) and (D). If the content of component (D) is greater than or equal to the lower limit of the range described above, adhesion properties of the cured product can increase. On the other hand, it is less than or equal to the upper limit of the range described above, curability of the composition can increase and mechanical properties of the cured product can increase.

The present composition comprises components (A) to (D) described above; however, to impart better mechanical strength to a cured product of the present composition, a photosensitizer, and/or an adhesion promoter other than component (C), and/or an alcohol, and/or an inorganic filler can be contained.

Examples of the photosensitizers include isopropyl-9H-thioxanthen-9-one, anthrone, 1-hydroxycyclohexyl-phenylketone, 2,4-diethyl-9H-thioxanthen-9-one, 2-isopropyl thioxanthene, 2-hydroxy-2-methyl-phenylpropan-1-one, 2,6-bis(1,1-dimethylethyl)-4-methylphenol (BHT), pentaerythritol tetrakis[3-(3,5-di-tert-butyl-4-hydroxyphenyl) propionate], thiodiethylene bis[3-(3,5-di-tert-butyl-4-hydroxyphenyl)propionate], octadecyl-3-(3,5-di-tert-butyl-4-hydroxyphenyl)propionate, 2,4-dimethyl-6-(1-methylpentadecyl)phenol, diethyl[{3,5-bis(1,1-di-tert-butyl-4-hydroxyphenyl)methyl}phosphonate, 3 3',3",5,5',5"-hexane-tert-butyl-4-a,a',a"-(mesitylene-2,4,6-tolyl)tri-p-cresol, 4,6-bis(octylthiomethyl)-o-cresol, ethylenebis (oxyethylene)bis[3-(5-tert-butyl-4-hydroxy-m-tolyl) propionate], and hexamethylene bis[3-(3,5-di-tert-butyl-4-hydroxyphenyl)propionate].

The content of the photosensitizer is not limited, but it is generally in a range of from about 0.001 to about 1 mass %, optionally in a range of from about 0.005 to about 0.5 mass %, or optionally in a range of from about 0.005 to about 0.1 mass %, of the total mass of components (A), (B), (C), (D) and the photosensitizer. If the content of the photosensitizer is greater than or equal to the lower limit of the range described above, curability of the cured product can increase. On the other hand, it is less than or equal to the upper limit of the range described above, optical clearance of the cured product can increase.

Examples of adhesion promoters include epoxy-functional alkoxysilane such as 3-glycidoxypropyltrimethoxysilane, 3-g lycidoxypropyltriethoxysilane, 2-(3,4-epoxycyclohexyl)ethyldimethoxysilane, 2-(3,4-epoxycyclohexyl) ethyldiethoxysilane and combinations thereof; unsaturated alkoxysilanes such as vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof; an epoxy-functional siloxane with silicon atom-bonded alkoxy groups such as a reaction product of a hydroxy-terminated polyorganosiloxane with an epoxy-functional alkoxysilane (e.g. such as one of those described above), or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

The content of the adhesion promoter is not limited, but it is generally in an amount of from about 0.01 to about 5 mass %, or optionally in an amount of from about 0.1 to about 2 mass %, of the total mass of components (A), (B), (C), (D) and the adhesion promoter.

Examples of the alcohol include monovalent alcohols such as ethyl alcohol, isopropyl alcohol, isobutyl alcohol, 1-decanol, 1-dodecanol, 1-octanol, oleyl alcohol, 1-hexadecanol, and stearyl alcohol; and multivalent alcohols such as ethylene glycol, diethylene glycol, propylene glycol, 1,10-decanediol, glycerol, and pentaerythritol.

The content of the alcohol is not limited, but it is generally in an amount of from about 0.01 to about 10 mass %, or optionally in an amount of from about 0.1 to about 10 mass %, of the total mass of components (A), (B), (C), (D) and the alcohol.

An inorganic filler enhances mechanical strength of a cure product. Examples of the filler include one or more of finely divided treated or untreated precipitated or fumed silica; precipitated or ground calcium carbonate, zinc carbonate; clays such as finely divided kaolin; quartz powder; aluminum hydroxide; zirconium silicate; diatomaceous earth; wollastonite; pyrophylate; and metal oxides such as fumed or precipitated titanium dioxide, cerium oxide, magnesium oxide powder, zinc oxide, and iron oxide.

The content of the filler is not limited, but it is generally in a range of from about 1 to about 95 mass %, optionally in a range of from about 5 to about 95 mass %, or optionally in a range of from about 5 to about 90 mass %, of the total mass of components (A), (B), (C), (D) and the filler.

The present composition can be cured by irradiation of UV ray (or ultraviolet ("UV") light). For example, low pressure, high pressure or ultrahigh pressure mercury lamp, metal halide lamp, (pulse) xenon lamp, or an electrodeless lamp is useful as an UV lamp. Irradiation dose is generally in a range of from about 5 to about 6,000 $mJ/cm^2$, or optionally in a range of from about 10 to about 4,000 $mJ/cm^2$.

<Cured Product>

The present composition forms a cured product when cured by irradiation with UV ray. This cured product according to the present invention has a hardness, as measured using Shore D hardness specified in ASTM D2240, in the range from at least 20 to not more than 95, typically in the range from at least 30 to not more than 80, and more typically in the range from at least 30 to not more than 70. The reasons for this are as follows: the cured product may have insufficient strength when its hardness is less than the lower limit for the cited range; when, on the other hand, the upper limit for the cited range is exceeded, the flexibility of the cured product under consideration tends to be inadequate.

In order to exhibit a satisfactory flexibility, this cured product may have an elongation as specified in ASTM D412 of at least 10%. The reason for this is that the flexibility of the cured product becomes unsatisfactory at below the indicated range.

The cured product of the present invention, because it is flexible and highly transparent, is useful as an optical member or component that is permeable to light, e.g., visible light, infrared, ultraviolet, far ultraviolet, x-ray, laser, and so forth. The cured product of the present invention is also useful as an optical member or component that should or must be flexible, e.g., due to use in a flexed or bent condition, and is also useful as an optical member or component for devices involved with high energy, high output light. In addition, an article or component having a flexible and highly transparent cured product layer can be made by making a composite in which the cured silicone material of the present invention is formed into a single article or body with any of various substrates, and an impact- and stress-relaxing function can also be expected from the cured product layer.

EXAMPLES

The curable silicone composition and cured product of the present invention will now be described in detail using Practical and Comparative Examples. Note that, in the formulas, "Me", "Pr", "Vi", "Ph", "Gly" and "Ep" respectively indicates methyl group, propyl group, vinyl group, phenyl group. 3-glycidoxypropyl group and 2-(3,4-epoxycyclohexyl)ethyl group. The structure of the epoxy-functional silicone resins used in the examples was determined by conducting $^{13}$C NMR and $^{29}$Si NMR measurements. The weight-average molecular weight of the epoxy-functional silicone resins was calculated using GPC based on comparison with polystyrene standards. Viscosity of epoxy-functional silicones and silicone resin was measured as follows.

<Viscosity>

Viscosity at 23±2° C. was measured by using a type B viscometer (Brookfield HA or HB Type Rotational Viscometer with using Spindle #52 at 5 rpm) according to ASTM D 1084 "Standard Test Methods for Viscosity of Adhesive."

Practical Examples 1-4 and Comparative Examples 1-9

The following components were used to prepare curable silicone compositions (mass %) shown in Table 1.

The following epoxy-functional silicone resin was used as component (A).

(a1): an epoxy-functional silicone resin with a weight-average molecular weight of 2,000 to 6,000 and represented by the following average unit formula:

$$(MePhSiO_{2/2})_{0.34}(PrSiO_{3/2})_{0.50}(EpSiO_{3/2})_{0.16}$$

The following epoxy-functional silicone was used as component (B).

(b1): an epoxy-functional silicone with a viscosity of 40 mPa·s, a weight-average molecular weight of 382, and represented by the following formula:

$$Ep\text{-}SiMe_2OSiMe_2\text{-}Ep$$

The following cationic photoinitiator was used as component (C).

(c1): a triarylsulfonium borate salt (CPI-310B produced by San-Apro Ltd.)

The following component was used as component (D).

(d1): a carbasilatrane derivative represented by the following formula:

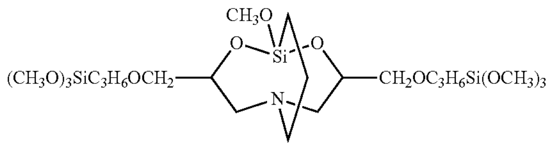

(d2): a silatrane derivative represented by the following formula:

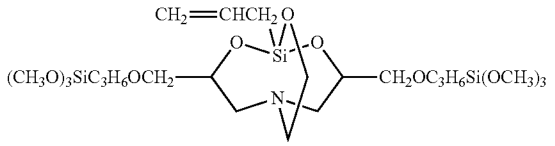

The following components were used as an adhesion promoter for comparison of component (D).

(d3): a silicone resin with a viscosity of 4800 mPa·s, a weight-average molecular weight of 2,200 and represented by the following average unit formula:

$$(ViSiO_{3/2})_{0.21}(PhSiO_{3/2})_{0.31}(MeGlySiO_{2/2})_{0.48}$$

(d4): 3-methacryloxypropyl trimethoxysilane (d5): methyl trimethoxysilane (d6): bis(trimethoxysilyl) hexane (d7): 2-(3,4-epoxycyclohexyl) ethyl trimethoxysilane (d8): 3-glycidoxypropyl trimethoxysilane The following components were used as an ultraviolet stabilizer for comparison of component (D).

(e1): a mixture of: bis(1,2,2,6,6-pentamethyl-4-piperidyl) sebacate and methyl-1,2,2,6,6-pentamethyl-4-piperidyl sebacate (e2): a mixture of: 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine About 0.1-3 g of each curable silicone composition was loaded into a slide glass. After leveling the surface level by bar coater, it goes through Metal halide UV Lamps with D bulb in the light intensity of 5000 mW/cm$^2$ to cure the curable silicone compositions. The cured products were evaluated as follows. The properties of the cured products thereof are shown in Table 1.

<Adhesion Strength to Glass and Failure Mode>

The adhesion strength of this material is determined by measuring the amount of pull required to separate a lap shear laminate (lap shear strength). The results are reported in kgf per square centimeter. At the same time, adhesive failure mode was observed. In the Table 1, "CF" and "AF" mean cohesive failure mode and adhesive failure mode, respectively. The procedure is similar to ASTM D-816, ASTM D-1002, MIL-S-8802, ASTM C-961.

<Yellow Index After Aging at 110° C. for 75 hrs.>

Samples with a thickness of about 150 microns in a sandwich glass structure were prepared. it goes through Metal halide UV Lamps with D bulb in the light intensity of 5000 mW/cm$^2$ to cure the curable silicone compositions. The initial yellow index (ASTM D1925) were measured by spectrometer. And after aging 75 hrs. in a convection oven set at 110° C., the yellow index (ASTM D1925) were measured in the same way.

<Yellow Index After Aging at QUV for 10 Days>

Samples with a thickness of about 150 microns in a sandwich glass structure were prepared. it goes through Metal halide UV Lamps with D bulb in the light intensity of 5000 mW/cm$^2$ to cure the curable silicone compositions. The initial yellow index (ASTM D1925) were measured by spectrometer. And after aging at QUV(0.55 W/60° C./10 days), the yellow index (ASTM D1925) were measured in the same way.

TABLE 1

| | | | Practical Examples | | | | Comparative Examples | | |
|---|---|---|---|---|---|---|---|---|---|
| | | | 1 | 2 | 3 | 4 | 1 | 2 | 3 |
| Curable | (A) | (a1) | 76.40 | 76.00 | 75.50 | 75.50 | 76.50 | 75.50 | 75.50 |
| silicone | (B) | (b1) | 23.00 | 23.00 | 23.00 | 23.00 | 23.00 | 23.00 | 23.00 |
| composition | (C) | (c1) | 0.50 | 0.50 | 0.50 | 0.50 | 0.50 | 0.50 | 0.50 |
| (mass %) | (D) | (d1) | 0.10 | 0.50 | 1.00 | 0 | 0 | 0 | 0 |
| | | (d2) | 0 | 0 | 0 | 1.00 | 0 | 0 | 0 |
| | | (d3) | 0 | 0 | 0 | 0 | 0 | 1.00 | 0 |
| | | (d4) | 0 | 0 | 0 | 0 | 0 | 0 | 1.00 |
| | | (d5) | 0 | 0 | 0 | 0 | 0 | 0 | 0 |
| | | (d6) | 0 | 0 | 0 | 0 | 0 | 0 | 0 |
| | | (d7) | 0 | 0 | 0 | 0 | 0 | 0 | 0 |
| | | (d8) | 0 | 0 | 0 | 0 | 0 | 0 | 0 |
| | (E) | (e1) | 0 | 0 | 0 | 0 | 0 | 0 | 0 |
| | | (e2) | 0 | 0 | 0 | 0 | 0 | 0 | 0 |
| Adhesion Strength (kgf/cm$^2$) | | | 5~7 | 10~12 | 8~10 | 8~10 | 3~5 | 3~5 | 3~5 |
| Failure Mode | | | CF | CF | CF | CF | AF | AF | AF |
| Yellow Index | | | | | | | | | |
| After aging at 110° C. for 75 hrs. | | | 30 | 8 | <1 | <1 | >30 | >30 | >30 |
| After aging at QUV for 10 days | | | 17 | 12 | 5 | 5 | >20 | >20 | >20 |

| | | | Comparative Examples | | | | | |
|---|---|---|---|---|---|---|---|---|
| | | | 4 | 5 | 6 | 7 | 8 | 9 |
| Curable | (A) | (a1) | 75.50 | 75.50 | 75.50 | 75.50 | 76.45 | 76.45 |
| silicone | (B) | (b1) | 23.00 | 23.00 | 23.00 | 23.00 | 23.00 | 23.00 |
| composition | (C) | (c1) | 0.50 | 0.50 | 0.50 | 0.50 | 0.50 | 0.50 |
| (mass %) | (D) | (d1) | 0 | 0 | 0 | 0 | 0 | 0 |
| | | (d2) | 0 | 0 | 0 | 0 | 0 | 0 |
| | | (d3) | 0 | 0 | 0 | 0 | 0 | 0 |
| | | (d4) | 0 | 0 | 0 | 0 | 0 | 0 |
| | | (d5) | 1.00 | 0 | 0 | 0 | 0 | 0 |
| | | (d6) | 0 | 1.00 | 0 | 0 | 0 | 0 |
| | | (d7) | 0 | 0 | 1.00 | 0 | 0 | 0 |
| | | (d8) | 0 | 0 | 0 | 1.00 | 0 | 0 |
| | (E) | (e1) | 0 | 0 | 0 | 0 | 0.05 | 0 |
| | | (e2) | 0 | 0 | 0 | 0 | 0 | 0.05 |
| Adhesion Strength (kgf/cm$^2$) | | | 3~5 | 3~5 | 3~5 | 3~5 | 3~5 | 3~5 |
| Failure Mode | | | AF | AF | AF | AF | AF | AF |
| Yellow Index | | | | | | | | |
| After aging at 110° C. for 75 hrs. | | | >30 | >30 | >30 | >30 | 20 | 30 |
| After aging at QUV for 10 days | | | >20 | >20 | >20 | >20 | 12 | 17 |

INDUSTRIAL APPLICABILITY

The curable silicone composition of the present invention can be cured by irradiation with UV ray. Therefore, the present composition is useful as various adhesives, encapsulants, coating agents, and the like of electric/electronic parts.

The invention claimed is:

1. A curable silicone composition comprising:

(A) an epoxy-functional silicone resin represented by the following average unit formula:

$$(R^1{}_3SiO_{1/2})_a(R^1{}_2SiO_{2/2})_b(R^1SiO_{3/2})_c(SiO_{4/2})_d$$

wherein each $R^1$ is the same or different organic group selected from a $C_{1-6}$ monovalent aliphatic hydrocarbon group, a $C_{6-10}$ monovalent aromatic hydrocarbon group, and a monovalent epoxy-substituted organic group, provided that at least about 15 mol % of the total R are the $C_{6-10}$ monovalent aromatic hydrocarbon groups; and "a", "b", "c", and "d" are numbers that satisfy the following conditions: $0 \le a < 0.4$, $0 < b < 0.5$, $0 < c < 1$, $0 \le d \le 0.4$, $0.1 \le b/c \le 0.6$, and $a+b+c+d=1$; and about 2 to about 30 mol % of the total siloxane units have the monovalent epoxy-substituted organic groups;

(B) an epoxy-functional silicone represented by the following general formula:

$$X^1—R^2{}_2SiO(SiR^2{}_2O)_mSiR^2{}_2—X^1$$

wherein each $R^2$ is the same or different organic group selected from a $C_{1-6}$ monovalent aliphatic hydrocarbon group and a $C_{6-10}$ monovalent aromatic hydrocarbon group; each $X^1$ is the same or different group selected from a monovalent epoxy-substituted organic group and an epoxy-functional siloxy group represented by the following general formula:

$$X^2—R^3{}_2SiO(SiR^3{}_2O)_xSiR^3{}_2—R^4—$$

wherein each $R^3$ is the same or different $C_{1-6}$ monovalent aliphatic hydrocarbon group; $R^4$ is a $C_{2-6}$ alkylene group; $X^2$ is a monovalent epoxy-substituted organic group; and "x" is a number of from about 0 to about 5, and "m" is a number of from about 0 to about 100, in an amount of from about 5 mass % to about 40 mass % of the total mass of components (A), (B), (C) and (D);

(C) a cationic photoinitiator, in an amount of from about 0.2 mass % to about 2 mass % of the total mass of components (A), (B), (C) and (D); and (D) a silatrane derivative or a carbasilatrane derivative, wherein each derivative has at least one silicon atom-bonded alkoxy group per molecule, in an amount of from about 0.01 mass % to about 5.0 mass % of the total mass of components (A), (B), (C) and (D).

2. The curable silicone composition according to claim 1, wherein the monovalent epoxy-substituted organic groups in component (A) are groups selected from glycidoxyalkyl groups, 3,4-epoxycyclohexylalkyl groups, and epoxyalkyl groups.

3. The curable silicone composition according to claim 1, wherein the monovalent epoxy-substituted organic groups in component (B) are groups selected from glycidoxyalkyl groups, 3,4-epoxycyclohexylalkyl groups, and epoxyalkyl groups.

4. The curable silicone composition according to claim 1, wherein component (D) is a silatrane derivative or carbasilatrane derivative represented by the following general formula:

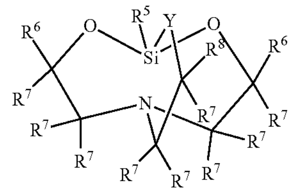

wherein $R^5$ is a group selected from a $C_{1-6}$ alkyl group, a $C_{2-6}$ alkenyl group, and a $C_{1-6}$ alkoxy group; each $R^6$ is the same or different alkoxysilyl alkyloxyalkyl group; each $R^7$ is the same or different hydrogen atom or a $C_{1-6}$ alkyl group; $R^8$ is a hydrogen atom or an alkoxysilyl alkyloxyalkyl group; and Y is an oxygen atom or a methylene group.

5. The curable silicone composition according to claim 1, wherein component (D) is a carbasilatrane derivative represented by the following formula:

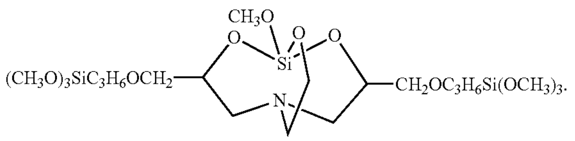

6. The curable silicone composition according to claim 1, wherein component (D) is a silatrane derivative represented by the following formula:

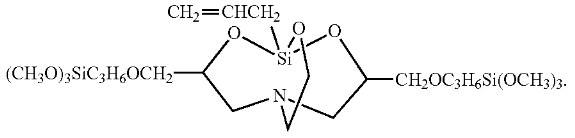

7. A cured product obtained by curing the curable silicone composition according to claim 1.

* * * * *